I. N. Gates,
Cultivator.

No. 97,073.      Patented Nov. 23, 1869.

Witnesses:
Chas. Nida
Alex F. Roberts

Inventor:
I. N. Gates
per [Attorney]

UNITED STATES PATENT OFFICE.

I. N. GATES, OF BURNSIDE, ILLINOIS.

IMPROVEMENT IN CULTIVATORS.

Specification forming part of Letters Patent No. 97,073, dated November 23, 1869.

*To all whom it may concern:*

Be it known that I, I. N. GATES, of Burnside, in the county of Hancock and State of Illinois, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1:
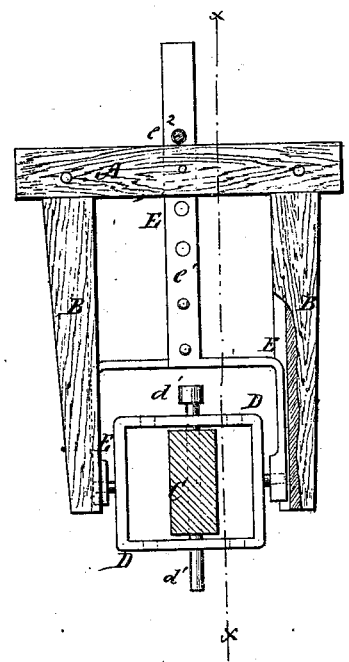
Figure 2:
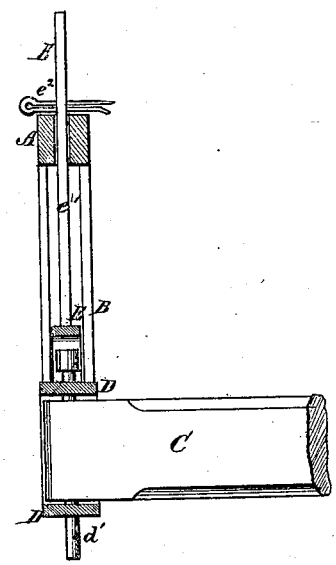

Figure 1 is a rear view of a portion of the truck-frame of a cultivator illustrating my invention. Fig. 2 is a detail vertical section of the same, taken through the line $x\ x$, Fig. 1.

Similar letters of reference indicate corresponding parts.

My invention has for its object to furnish an improved device for connecting the plow-beams to the truck-frame of a cultivator, which shall be simple in construction, strong and durable, and effective in operation, permitting a free vertical and lateral movement of the plows, and at the same time holding the plow-beams loosely and steadily, preventing all tendency of the plow to wallow or tip when plowing crooked rows; and it consists in the construction and combination of the knuckle and knuckle-holder with the plow-beam and truck-frame of the cultivator, as hereinafter more fully described.

A represents a part of the truck-frame of a cultivator, about the construction of which there is nothing new.

B are two downwardly-projecting posts attached to the frame A, as many pairs of which are used as there are plows to be attached to the cultivator.

C is the plow-beam, the forward end of which is pivoted to the knuckle D by a pin, $d'$, passing through a hole in the beam C, and through one or the other of the holes through the knuckle D, according as it is desired to have the plow run closer to or farther from the row of plants being cultivated.

The knuckle D is made in the form of a rectangular frame, having gudgeons or pivots attached to or formed upon its ends, by which pivots it is pivoted to the side bars of the knuckle-holder E. The side bars of the knuckle-holder E slide up and down in grooves in the inner sides of the posts B.

To the middle part of the cross-bar of the holder E is attached a bar, $e'$, which passes up through a mortise or hole in the frame A, where it is secured in place by a pin or key, $e^2$, passed through one or the other of the holes formed for its reception in the said bar $e'$, or by nuts placed upon the said bar above and below the frame A, so that by raising and lowering the holder E the plows may be adjusted to run shallower or deeper in the ground, as may be required.

Having thus described my invention, I claim as new and desire to secure by Letters Patent—

The knuckle D and adjustable knuckle-holder E $e'$, constructed and operating in connection with the plow-beam and truck-frame of a cultivator, substantially as herein shown and described, and for the purpose set forth.

I. N. GATES.

Witnesses:
 THOMAS GATES,
 M. O. JACOB.